No. 630,920. Patented Aug. 15, 1899.
G. W. NOLAND.
ANIMAL TAIL HOLDER.
(Application filed May 18, 1898.)

(No Model.)

Witnesses
J. Grant Culverwell.
N. F. Riley.

George W. Noland, Inventor.
By his Attorneys,
C. A. Snow & Co.

UNITED STATES PATENT OFFICE.

GEORGE W. NOLAND, OF PARKVILLE, MISSOURI.

ANIMAL-TAIL HOLDER.

SPECIFICATION forming part of Letters Patent No. 630,920, dated August 15, 1899.

Application filed May 18, 1898. Serial No. 681,055. (No model.)

*To all whom it may concern:*

Be it known that I, GEORGE W. NOLAND, a citizen of the United States, residing at Parkville, in the county of Platte and State of Missouri, have invented a new and useful Animal-Tail Holder, of which the following is a specification.

The invention relates to improvements in animal-tail holders.

The object of the present invention is to improve the construction of devices for holding the tails of animals and to provide a simple, inexpensive, and efficient device adapted to be readily applied to a horse or a cow for holding the tails while a cow is being milked or a horse is being shod.

The invention consists in the construction and novel combination and arrangement of parts, as hereinafter fully described, illustrated in the accompanying drawings, and pointed out in the claims hereto appended.

Figure 1:
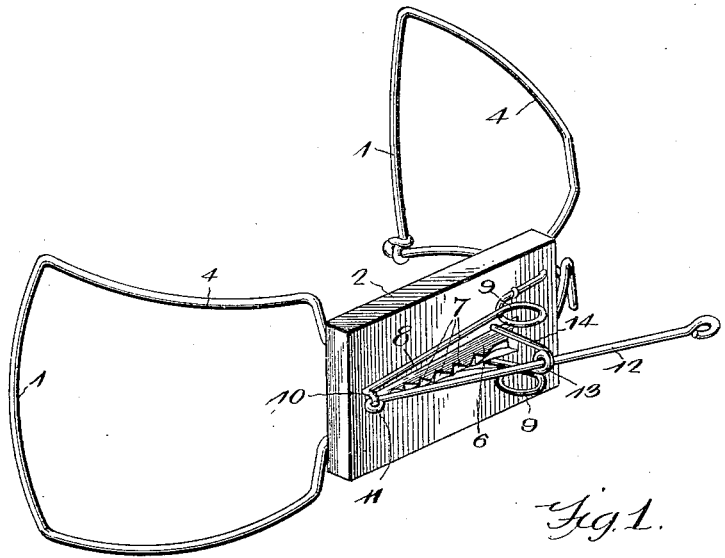
Figure 2:
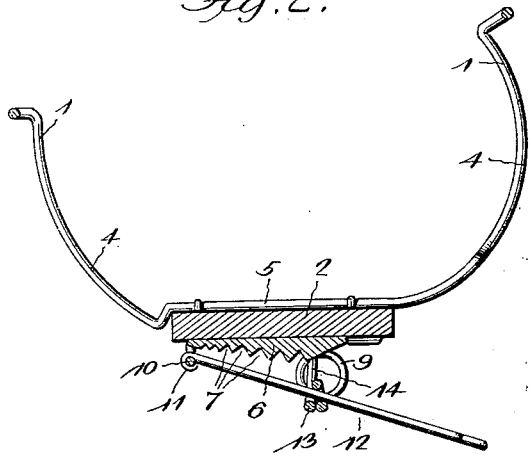
Figure 3:
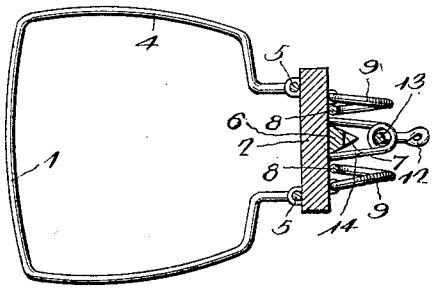

In the drawings, Figure 1 is a perspective view of an animal-tail holder constructed in accordance with this invention. Fig. 2 is a longitudinal sectional view of the same. Fig. 3 is a transverse sectional view.

Like numerals of reference designate corresponding parts in all the figures of the drawings.

1 1 designate a pair of curved loops extending outward from a plate 2 and adapted to engage the hips of a cow or horse for supporting the device thereon, and these loops, which have curved sides 4, are substantially rectangular, being constructed of a single piece of stout spring-wire. The loops are connected by substantially parallel intermediate portions 5, which are stapled or otherwise secured to the inner face of the plate 2. The wire of which the hip-engaging loops are constructed is bent to form the loops or jaws and is secured together at its ends, preferably at one of the corners of the loops, as illustrated in the accompanying drawings, and it is bent inward at the inner ends of the loops or jaws to bring the connecting portions of the wires closer together.

The plate 2 is provided at its outer face with a longitudinal rib 6, which tapers both in length and in thickness, it being substantially triangular in cross-section, with the apex at the outer edge. The outer edge of the rib is serrated to form a series of notches 7 and teeth, and the tail of an animal is clamped against the rib by a catch having a substantially V-shaped jaw 8.

The catch, which engages the tail of an animal, is constructed of spring-wire or other suitable material, and the sides of the V-shaped jaw are provided with spring-coils 9, the terminals of the wire being secured to the outer face of the plate by staples or other suitable fastening devices. The outer end or apex of the V-shaped jaw is bent outward to form an eye 10, into which is linked an eye 11 of one end of a lever 12, adapted to lift the jaw from the plate and enable a portion of the tail of an animal to be readily introduced into the device. The lever, which is constructed of a piece of wire or other suitable material, is fulcrumed loosely in an eye 13 of a substantially U-shaped support 14, which straddles the rear end of the rib. The U-shaped support is preferably constructed of a piece of stout wire which is doubled and coiled at its bend to form the eye 13, and the terminals of the wire of the support are embedded in or otherwise secured to the plate.

The invention has the following advantages: The device, which is simple and comparatively inexpensive in construction, is adapted to be readily applied to the hips of a horse or cow, and it may be easily removed therefrom. It is capable of holding the tail of a cow and of preventing the animal from annoying a person while milking it. The device is also applicable to horses and will be found especially advantageous for holding their tails while they are being shod.

Changes in the form, proportion, and minor details of construction may be resorted to without departing from the spirit or sacrificing any of the advantages of this invention.

What I claim is—

1. A device of the class described comprising a body provided with means for engaging the hips of an animal, a jaw mounted on the body and arranged to engage the tail of an animal, a support having an eye or opening, and a lever connected with the jaw and passing through the eye or opening of the support and loosely fulcrumed thereon, substantially as described.

2. A device of the class described comprising a plate or body provided with means for engaging the hips of an animal, a rib arranged on the plate or body and having serrations or teeth, a catch mounted on the plate or body and having a jaw consisting of a loop, and a lever fulcrumed between its ends on the plate or body and provided at its outer end with an eye linked into the outer end of the jaw of the catch, substantially as described.

3. A device of the class described, comprising a plate or body provided with means for engaging the hips of an animal, a tapering rib arranged on the plate or body and provided with serrations or teeth, a V-shaped catch provided at the ends of its sides with coils, a support straddling the rib and provided with an eye, and a lever passing through the eye of the support and connected with the outer end of the catch, substantially as described.

4. A device of the class described comprising a plate or body provided with means for engaging the hips of an animal and having a projecting rib, a spring-catch mounted on the plate or body and provided with a loop forming a jaw and extending around the rib, the latter projecting through the said loop, and a lever connected with the loop and adapted to open the catch, substantially as described.

In testimony that I claim the foregoing as my own I have hereto affixed my signature in the presence of two witnesses.

GEORGE W. NOLAND.

Witnesses:
JAMES GARGER,
W. T. NOLAND.